United States Patent Office 3,033,713
Patented May 8, 1962

3,033,713
IMPROVED-STABILIZED BRAZING FLUXES AND BINDERS
James G. Bielenberg, Madison, and Carl J. Dauber, Cranford, N.J., assignors to Air Reduction Company, Incorporated, New York, N.Y., a corporation of New York
No Drawing. Filed Apr. 29, 1960, Ser. No. 23,363
14 Claims. (Cl. 148—23)

This invention relates to the combinations of fluxes and alloys for brazing, and improved fluxes and binders for combining alloys and fluxes. This invention is more particularly directed to improved brazing fluxes and binders that provide a stable combination of the alloy and flux in a unitary construction as well as providing a non-hygroscopic material. Further, this invention provides for an improved method for silver alloy brazing.

In conventional alloy brazing techniques the materials to be joined by brazing are coated or the joint areas are provided with large and sometimes excessive amounts of flux by dipping the material into a flux bath or by painting or coating techniques. In many cases open containers or jars are utilized for holding the flux until it is required. This normally leads to problems of flux deterioration, loss of consistency, and results in general poor control over the flux properties. As indicated, the conventional techniques often result in difficulties, in that excess or inadequate amounts of flux may be added to the area to be joined.

After the joint area has been fluxed, alloy is then utilized to provide the final joint. In the case of manual addition of alloy the problem of proper amounts of alloy to be used is encountered. There is also the problem of whether or not sufficient flux has been provided for the amount of alloy required for a proper joint. After the brazing operation has been completed, one has a cleaning problem for the removal of excessive flux.

In general, the conventional brazing techniques frequently result in excessive consumption of flux, poor control of the amount of alloy and flux used; require time consuming operations for cleaning; and result in poor quality control over the standard of joint produced or the properties concerning a good bond.

In an effort to overcome the disadvantages of the two-step techniques of alloy brazing, attempts have been made to combine the alloy and flux in a unitary construction whereby the problem of excessive flux and the two-step procedure would be eliminated. Items such as tubes or wires containing flux cores, alloy wires with a flux coating, pastes containing fluxes and alloys; or combinations of these techniques, have been proposed; to eliminate, lessen, or solve the problems and disadvantages of the two-step alloy brazing technique, with the single operation of placing the unitary combination of alloy and flux in the area to be joined and carrying out the brazing by the heating of the article or the area to be joined.

While these proposed solutions to the problem of alloy brazing have some merit, they are not entirely satisfactory since many of the disadvantages of the conventional brazing technique are still encountered as well as the problems and disadvantages inherent in the combination of alloy and flux. In the first place, one now has the problem of joining or combining the alloy and flux, which generally necessitates the use of a binding agent or material to maintain a uniform mixture or ratio of alloy to flux and to prevent the alloy and flux from separating. Thus, providing a binder that is suitable becomes a problem; as well as providing a binder that is compatible in the brazing operation and does not decompose upon storage or lead to the formation of undesirable by-products that interfere with the brazing operation, or result in poor wetting properties of the alloy used. Further, unless the flux/alloy combination is efficient, the joint characteristics resulting will be poor.

It is, therefore, an object of this invention to provide improved flux/alloy combinations for brazing which will yield joints that are equivalent or superior to conventional brazing techniques.

Another object of this invention is to provide improved brazing techniques and improved brazing materials and combinations of materials, especially new and improved materials and methods for silver alloy brazing.

A further object of this invention is to provide an improved flux composition useful in flux/alloy compositions and providing for an increased brazing efficiency and formation of superior joints when used with flux/alloy combinations, as flux coated wires, flux cored wires or tubes, and when such flux/alloy combinations are used in preforms or preplacement forms.

A still further object of this invention is to provide polymeric binders useful in preparing flux/alloy combinations that do not interfere with the brazing operation and do not decompose to yield materials harmful to wetting of joint area or harmful to the final brazed joint area or that require substantial cleaning to remove.

Another object of this invention is to provide improved combinations of alloy, flux, and binder, especially for silver solder brazing, that produce strong superior joints by brazing, and combinations that are stable in storage or upon exposure to the atmosphere for prolonged periods of time.

These and other objects and other advantages of this invention will become apparent and will be clarified in the following description.

In accordance with the present invention, flux/alloy combinations are prepared. The flux/alloy combinations are used in standard brazing methods as when a filler metal or alloy is melted on the areas to be joined and that has been prepared for brazing by the application of a flux that cleans the joint prior to melting of the alloy. In these joining techniques relatively low melting filler metals or alloys are used which melt at a temperature below that of the metals or metal to be joined. The materials and methods of this invention are particularly applicable to the method of brazing termed "silver alloy or silver solder brazing." That is, the alloy or filler metal is composed mainly of silver metal and such silver brazing alloys melt in the range of approximately 1100° F. to 1600° F.

The present invention is applicable to the joining of ferrous or non-ferrous metals or joining of ferrous to non-ferrous metals; such as brass to brass, brass to steel, and steel to steel joints.

The materials of this invention can be assembled in various forms as: flux coated wires, flux coated wires with flux cores, flux cored wires or tubing, flux cored wires with a longitudinal open seam or a seam that opens readily when the material is heated, flux cored wire or tubing with spaced passages for the flowing flux. Hollow balls of brazing alloy containing flux which may be linked to form a bead chain can also be prepared.

The coated wires or cored wires are especially useful in preforms, preplacement forms, or rings of the combination material that can be placed on or in the area to be joined and the parts can then be introduced into a brazing furnace or heated with a torch. The use of preforms is advantageous for assembling many types of work or continuous processing methods. All of these materials can also be used in the general or manual brazing methods and are advantageous in that the flux and alloy are combined and the operator does not have to perform the fluxing and alloy addition steps separately.

In general, the wire, core, or coating cannot be composed of ordinary fluxes and alloys. One cannot combine any flux with any binder, as the coating or the core may be too fragile, the flux may be readily lost, and the resultant joint be of poor quality. The flux used in this invention must of high efficiency because of the amount of flux used; if the flux is not performing properly, the joint produced will be inferior.

In general, the fluxes that are useful in this invention comprise the ingredients with the following range of proportions:

| | Percent by weight |
|---|---|
| Alkali metal fluoroborate | 50 to 80 |
| Alkali metal tetraborate | 9 to 30 |
| Boric acid maximum | 15 |
| Alaki metal carbonate do | 10 |

While potassium or sodium salts may be used in the practice of the invention, it is desirable to use the potassium salt in certain applications since the yellow glare produced by the sodium salts tends to obscure the work area when a torch is used to provide the heat required for brazing.

The following are specific flux compositions, that are illustrative of the invention:

I—Ingredients:

| | Percent by weight |
|---|---|
| Potassium fluoroborate, $KBF_4$ | 57 |
| Sodium tetraborate, $Na_2B_4O_7$ | 25 |
| Boric acid, $H_3BO_3$ | 9 |
| Potassium carbonate, $K_2CO_3$ | 9 |

II—Ingredients:

| | |
|---|---|
| Potassium fluoroborate, $KBF_4$ | 56.90 |
| Potassium tetraborate, $K_2B_4O_7 \cdot 5H_2O$ | 25.00 |
| Boric anhydride, $B_2O_3$ | 9.05 |
| Potassium carbonate, $K_2CO_3$ | 9.05 |

It will be noted in the illustrative general and specific formulas that anhydrous and hydrated tetraborate are shown. It has been found that poor flux properties and the poor brazing results are obtained if large amounts of hydrated materials are used. Thus, in general, it is desirable to use anhydrous materials in preparing the flux compositions useful in the flux/alloy combinations of this invention. Where the hydrated materials are used, it is desirable that the amount used be limited, as indicated, in order to obtain good brazing results and good flux properties. As outlined in composition II, boric anhydride may be used in place of boric acid. Potassium acid fluoride, added to the main flux composition may be used in preparing the flux, as illustrated in Table No. 1.

In preparing the flux compositions of this invention it is important that all of the individual ingredients be uniformly mixed. The materials may be mixed prior to the addition of the polymeric binder or may be mixed with the binder. It is important that the flux mixture be uniform and in some cases grinding or size reduction may be required for uniform mixing and subsequent use, for example, in making cored or coated wires. Thus, the final mesh size of the flux composition particles should be from about 80 mesh to 200 mesh and preferably at least 100 mesh.

It is also important that the flux contain little or no water. There should be no more than about 3 percent water, that is free water removable by heating at about 212° F., in the final flux mixture. As described previously, by proper selection of ingredients that are dry or contain little or no moisture, one may produce the flux by simply mixing. In the case where the materials do contain moisture, it is possible in some cases simply to dry the material to remove excess moisture. In many cases, however, the flux ingredients have been exposed to the atmosphere and the moisture absorbed or picked up is bound or strongly absorbed by the material, and simple drying is not sufficient to remove the moisture or reduce it to a sufficient level and in these cases, heating at high temperatures is required.

For those flux compositions containing substantial amounts of moisture, as hydrated materials, which cannot be eliminated by drying, suitable fluxes may be prepared by fusing. The flux is fused or melted in a suitable container, as a ceramic crucible, until the fused material becomes a clear, glass-like material. Any suitable means may be used for fusing the flux, as a kiln or gas flame. The fused flux is allowed to cool and harden, and is then ground to a fine particle size. Fused flux is advantageous as it has a low water content and resists moisture absorption from the atmosphere.

As described previously, another object of this invention relates to improved binders or binding agents. The binder being added to the flux to provide adhesion or correct bonding of flux and alloy; as well as maintaining the flux at an even consistency for the fabrication step or coated wires or cored tubes as well as providing a non-hygroscopic flux. The binder must hold the flux, and alloy together after the combination has been made. It is also important that the binder or bonding agent or the decomposition products do not interfere with the wetting properties or wetting process of the alloy to the base metals being joined; as the filler metal or alloy is distributed between the joint surfaces by capillary attraction. Thus, if the binder or its decomposition products interferes with the capillary attraction of the alloy, a poor or unstable joint will result. It is desirable also that the binder used does not result in a dirty joint after brazing, or require excessive cleaning of the finished joint.

It has been found that one class of polymeric materials is especially suitable in the preparation of the compositions of this invention. In general, it appears that the manner in which the polymeric material decomposes, determines whether or not it is suitable in the invention. The organic polymeric material should decompose and volatilize without the production of excessive smoke, odor, or residue, and should not interfere with the brazing action. The polymers are produced generally by the addition polymerization of suitable monomers. When used in the flux compositions of this invention, polymers that decompose or degrade such that the decomposition products volatilize readily, are required. Polymers that produce excessive carbon or other materials that do not volatilize and thus remain behind to interfere with brazing action are unsuitable.

Polymers that are useful as binders include homopolymers and copolymers of acrylic acid esters and methacrylic acid esters. For example, polymethyl acrylate, polyethyl methacrylate, and copolymers composed of methyl acrylate and ethyl methacrylate. A specific copolymer containing 72 percent by weight of ethyl methacrylate and 28 percent by weight of methyl acrylate has been found especially useful in the practice of this invention. For ease of processing the binder is dissolved in a suitable solvent. Toluene is a suitable solvent for the polymers, while other solvents, such as ethyl alcohol, may be used. A binder solution containing 40 percent polymer and 60 percent solvent gives easy processing when the flux is mixed with the binder and used in making flux/alloy combinations. While one may prepare the binder from the polymer and solvent, it is advantageous to utilize the commercial materials available that contain polymer dissolved in solvent. The specific 72 percent ethyl methacrylate-28 percent methyl acrylate copolymer in 60 percent toluene is available from Rohm and Haas Company, and is sold under the trade name "Acryloid B-72"; this copolymer is also available from the same manufacturer in dry form, without solvent.

In general, the amount of binder used can vary over a wide range of proportion of the flux. It is required that sufficient binder be used to maintain the combination of flux and alloy, to provide a non-hygroscopic flux, and a non-fragile or not easily breakable flux coating. When the flux/binder mixture is used as a coating on the alloy, the amount of binder should be adequate to produce a firm adherent, hard, and flexible flux coating on the alloy. While a high ratio of binder to flux may be used, it is uneconomical to use excess binder beyond that required, as excessive amounts of binder may tend to interfere with the brazing properties of the flux or alloy. Normally an amount of organic polymeric binder that is from 3 percent to 15 percent by weight of the total flux/binder mixture is useful. In the case of flux coated materials, as wire or tubing, an amount of binder from 10 percent to 15 percent by weight of the flux/binder mixture is preferred. For materials that are not coated with the flux, but have the flux surrounded or covered by alloy, such as flux cored wires or tubes, an amount of binder from 3 percent to 8 percent by weight of the flux/binder mixture is preferred. For coated materials, binder of 15 percent of the flux binder mixture is especially useful; while for cored materials, binder of 6 percent of the flux binder mixture is especially useful. For these ranges of binder the figure indicates the amount of polymeric material or solids. For ease of processing, the binder is dissolved in a suitable solvent such as toluene. As indicated previously, a binder composed of 40 percent polymer solids and 60 percent solvent is useful. For extrusion of the flux binder mixture it is desirable to add more solvent to give a mixture that is more fluid and can be handled easier.

In practice of this invention it is possible to coat the alloy with flux and apply the organic polymeric binder as a coating over the flux. The process is generally difficult to perform and it is more advantageous to mix the desired amount of binder directly into the flux composition and use the flux/binder mixture to prepare the unitary flux/alloy combinations.

Alloys useful in the practice of this invention include what are termed "silver brazing alloys" or "silver brazing filler metals." These alloys generally contain a substantial amount of silver along with other alloys or elements such as copper, phosphorous, zinc, cadmium, tin, and nickel, and in some cases, other metals are added. Most silver alloys consist of silver, copper, and zinc. In this invention silver alloys of the following composition are representative:

| Alloy ingredient: | Percent |
| --- | --- |
| Silver | 40 to 80 |
| Copper | 10 to 25 |
| Zinc | 0 to 35 |
| Cadmium | 10 to 30 |

Silver brazing alloys available from the Air Reduction Company, Incorporated and manufactured and sold under the trade name "Aircosil" are representative of the above described silver alloys and have been found especially useful in this invention.

The silver brazing alloys are available in thin sheets or strips, fine wire, rod, finely divided granular forms, rings, washers, and preforms. In most cases, all of these alloy forms are useful in preparing flux/alloy combinations. All of these alloy forms can be coated with flux/binder combinations to produce the useful materials of this invention. For example, the alloy wire may be coated with an outer layer of flux, by a continuous dipping or drawing through a flux/binder bath; or the wire may be coated by an extrusion process where the flux/binder is continually extruded around the traveling wire. It is also possible to draw or introduce a longitudinal seam or channel in the wire, insert the flux in said channel; and then close or seal this channel to provide greater protection to the flux. The final wire flux/alloy combinations can be used directly in manual brazing or they may be fabricated into preplacement forms, rings, washers, or shapes that can be preplaced in, on, or next to the area to be joined.

Butt-joint, flux cored tubing, with or without an external coating of flux can be made readily from the thin alloy strip stock. The alloy strip used should have a dead soft temper. The strip is selected or sheared to a width equal to the final desired tube circumference. The strip is then drawn through a series of circular dies to gradually form a hollow tube. While the tube is in a U-shaped cross section, flux is inserted into the core. The final die passes form the circular or oval cross section and results in a tube with an unsealed seam. In the preparation of preforms or preplacement rings it is desirable that the flux flow out of the seam in a uniform and constant manner. For this reason, it is desirable in the drawing operation to maintain the seam always parallel to the core tube longitudinal axis. That is, in the final drawing operations the seam should not be allowed to spiral or whirl around the axis of the tube. By making the seam straight and on one side of the tube, the seam always presents the same side, for the flux to flow. Thus, in a preform ring the flux may be directed to the interior of the ring uniformly. With this opening seam it is possible to direct the initial flow of flux and get a more uniform fluxing action, that is more efficient. While the flux core is usually sufficient, it is possible to coat this flux cored material with a flux coating if more flux is required or desired, by extrusion or dipping in a flux bath. It is convenient to prepare the flux core tubing with an amount of alloy approximately equivalent to solid alloy wire; thus, alloy strip 0.010 inch thick and 0.297 inch wide is approximately equal to 1/16 inch diameter wire, while alloy strip 0.004 inch thick and 0.203 inch wide is approximately equal to 1/36 inch diameter wire in terms of alloy per foot.

The fluxed cored tubing may also be prepared from a hollow ingot of the alloy, the hollow portion being filled with flux and sealed. The ingot then is reduced in diameter by rotary cold swaging and drawn to the final diameter. The cored tubing may be used directly or it may be further coated with flux. To induce a more uniform flux distribution, a seam may be provided in the tube by cutting or passages spaced along the cored tubing may be cut in the side wall to allow flux flow. This method is generally not preferred to the previously described strip method of making butt-joint flux cored tubing.

The flux cored tubing may be made in a variety of cross sectional shapes, as: circular, square, rectangular, diamond, triangular, oval, or elliptical. In the preparation of cored wire rings or preforms, an oval cross section is preferred because in bending the wire with the conventional circular cross section, to form the ring, the seam will open and the flux will be exposed more to the atmosphere. When the wire is oval in shape, this seam opening does not occur or occurs to lesser extent than when other cross sectional shapes are used. Also in the drawing operation, it is easier to form oval shaped tubing.

As indicated previously, the wire or solder available commercially may be coated directly with flux and used in the practice of this invention.

The flux/alloy combinations of this invention may be prepared in a variety of forms and structures, as previously indicated. The amount of flux combined with the alloy may be varied over wide ranges. Generally, however, sufficient flux should be provided, for the amount of alloy used, to provide proper and sufficient cleaning of the joint surfaces, so that alloy flow is not hampered. In most cases of typical brazing operations an amount of flux that is about 15 percent of the total weight of the flux/alloy combination gives good fluxing action. The amount of flux may be increased by using a thicker coating or applying a flux coating over flux cored material.

The following examples of various flux compositions, polymeric binders, fabrication of alloy/flux combinations and brazing techniques are illustrative of the inventive features, and are not intended to limit the area of invention.

Table No. 1 lists flux compositions used in the various examples. Table No. 2, is a list of the various alloys used in the examples.

TABLE NO. 1.—FLUX COMPOSITION

*Percent by Weight of Various Ingredients*

| Ingredients | 1 | 2 | 3 | 4 | 5 | 6 | 7 |
|---|---|---|---|---|---|---|---|
| Potassium fluoroborate (KBF$_4$) | 55 | 57.2 | 57 | 57 | 67 | 57 | 51.2 |
| Sodium tetraborate Na$_2$B$_4$O$_7$ | 15 | 14.3 | 25 | | | 10 | |
| Sodium tetraborate Na$_2$B$_4$O$_7$.10H$_2$O | 10 | 9.5 | | | 11 | 11 | |
| Potassium tetraborate K$_2$B$_4$O$_7$.5H$_2$O | | | | 25 | | | 22.5 |
| Boric acid H$_3$BO$_3$ | 10 | 9.5 | 9 | | 11 | 11 | |
| Boric acid anhydride B$_2$O$_3$ | | | | 9 | | | 8.15 |
| Potassium carbonate K$_2$CO$_3$ | 10 | 9.5 | 9 | 9 | 11 | 11 | 8.15 |
| Potassium acid fluoride KHF$_2$ | | | | | | | 10.0 |

TABLE NO. 2.—ALLOY COMPOSITION

*Percent by Weight of Various Ingredients*

| Ingredients | A | B | C | D |
|---|---|---|---|---|
| Silver | 50 | 45 | 35 | 15 |
| Copper | 15.5 | 15 | 26 | 80 |
| Zinc | 16.5 | 16 | 21 | |
| Cadmium | 18.0 | 24 | 18 | |
| Phosphorous | | | | 5 |

EXAMPLE 1

A particularly advantageous form of a flux/alloy combination is butt-joint, flux-cored tubing. This combination was prepared as follows: Foils or sheets of an alloy corresponding to alloy composition A in Table 2, with a dead soft temper, were prepared. The foil, of 10-mil thickness, was sheared to a width, approximately equal to the circumference of a $\frac{1}{16}$ inch diameter circle. The flat alloy strip material was then pulled through a series of dies, by means of a power driven take-up spool, to gradually form the flat strip into a U shaped cross section. The cross sectional U shaped strip was then passed under a flux feeder where a mixture of 2 parts by weight of flux and 1 part by weight of binder were packed into the core. Flux and binder solution of Example 3 was used. A grease gun was used, to force the flux binder mixture into the core, and pressure for extrusion was provided by the hand screw operated plunger. More uniform extrusion of the flux-binder was provided by utilizing an air cylinder to operate the plunger; this results in a more uniform flow of flux. The wire speed under the extruder for long runs was about 30 feet per minute. After the flux has been deposited in the core of the strip, the strip was then passed through a round die plate to form the U shaped strip into a butt-jointed tube or wire with the flux sealed in the center of the wire.

In order to prepare a flux cored wire that is useful in forming preformed rings the final pass was made through an oval shaped die, to provide a wire with an oval cross section. In other runs the final pass was through a round die plate, which gave a wire with a circular cross-section.

EXAMPLE 2

A flux corresponding to composition number one of Table No. 1 was prepared. The flux contained over 3 percent water, which resulted in processing difficulties when mixed with binder. The flux was heated at a high temperature to reduce the moisture content below 3 percent. The flux was mixed with a binder, containing 40 percent of a copolymer—72 percent ethyl methacrylate and 28 per cent methyl acrylate and 60 percent of toluene. The flux/binder mixture contained 100 parts of flux to 15 parts of binder.

Flux cored wire was prepared using the alloy and procedures described in Example 1. This flux cored wire gave excellent joints when used in brass to brass; brass to steel; and steel to steel specimens.

EXAMPLE 3

A flux corresponding to composition number one of Table No. 1 was prepared. The flux was uniformly mixed and had an average particle size of 80 mesh. Moisture content was less than 3 percent. The flux did not contain lumps and did not form lumps in subsequent processing. Two hundred parts of the flux was mixed with one hundred parts of binder. The binder was a copolymer, containing 72 percent by weight of ethyl methacrylate and 28 percent by weight of methyl acrylate, dissolved in toluene. The binder solution contained 40 percent by weight of copolymer solids and 60 percent by weight of toluene. Small amounts of toluene were added to the flux/binder mixture to provide a mixture of the proper consistency for extrusion.

With the alloy strip and procedures described in Example 1, the flux/binder mixture was used to prepare flux-cored, butt-joint tubing. The finished flux cored tubing had an amount of alloy approximately equal to $\frac{1}{16}$ inch diameter alloy wire. Brazing tests of this material were performed by using circular shaped cross section tubing in the form of preforms or rings. Specimens were prepared by positioning short sections of pipe, $\frac{1}{2}$ inch high by $1\frac{1}{4}$ inch in diameter, on 2-inch square plates. Specimens of brass pipe to brass plate; brass pipe to steel plate; and steel pipe to steel plate were prepared. Circular preforms of the flux cored tubing were inserted in all the pipes and positioned adjacent to the pipe/plate joint interface. All specimens were furnace brazed at approximately 1400° F.

All three specimens showed good brazing efficiency of flux and alloy, with complete penetration of the alloy and filleting on both the inside and outside of the pipe.

EXAMPLE 4

Flux cored tubing was prepared in the following manner: 50 parts silver; 15.5 parts copper; 16.5 parts zinc; and 18.0 parts cadmium were melted. Ingots were produced from the melt by casting in a graphite mold, an ingot measuring $\frac{3}{8}$ inch in diameter and 6 inches in length was provided after finishing. After annealing at 900° F., the rod was centered bored to provide a hollow core of 0.173 inch diameter. The core was then filled with a flux/binder mixture, using the flux and binder of Example 3, comprising 2 parts by weight flux and 1 part binder. The ingot ends were then crimped shut to retain the mixture in the core during processing. The original diameter, 0.375 inch, was reduced to 0.220 inch by rotary cold swaging in these passes. The cored rod was then reduced in thirteen 5-mil passes to a final diameter of 0.110 inch by drawing.

The flux cored wire produced can be used for brazing, but for many applications it is desirable that perforations be provided in the wire to allow the flux to escape from the core at areas remote, from the sheared ends. A seam may also be cut along the longitudinal axis of the cored wire; the seam extending into the flux core to allow the flux to flow from the core at fluxing temperatures.

EXAMPLE 5

A flux/binder mixture was prepared by uniformly mixing 75 parts of flux, composition No. 1, Table 1, and 25 parts of binder solution. The binder solution was the same as the one used in Example 3 and contained 40 percent of the copolymer in 60 percent toluene. Solid alloy wire, composition A, Table No. 2 was extrusion coated with the flux binder mixture. Alloy wire had a diameter of $\frac{1}{32}$ inch and the flux coating was approximately 16 mils thick. The coating was firmly adhering, hard, flexible, and permitted the coated wire to be shaped into preform rings.

When evaluated in various brazing techniques, the flux coated wire of this example gave good joint properties.

EXAMPLE 6

Using the flux and binder solution of Example 5 a flux/binder mixture was prepared containing 64 percent by weight flux and 37 percent by weight binder solution. Alloy wire, 1/32 inch in diameter, composition A, Table No. 2, was coated with flux, by continuous dipping in the flux/binder mixture. The alloy wire entered the bottom of a container of flux/binder mixture and was continuously coated by drawing it vertically, up and through the solution. Wires with a flux coating of 15 mils and 26 mils were produced in this manner. The flux coating had good mechanical and physical properties and did not deteriorate in storage. The coating had good moisture resistant properties.

The flux coated wires of this example had good brazing characteristics.

EXAMPLE 7

A flux corresponding to composition number 3 of Table No. 1 was prepared. Two hundred parts of the flux were mixed with 30 parts of a binder; the binder solution was 40 percent copolymer solids—72 percent ethyl methacrylate and 28 percent methyl acrylate—in 60 percent toluene. An additional 50 parts of toluene were added to the flux/binder mixture to obtain proper consistency for extrusion. Utilizing the general procedures outlined in Example 1 flux cored tubing was produced. The alloy used was composition B of Table No. 2 and was in strip form, 0.010 inch thick and 0.297 inch wide. The alloy used had a dead soft temper. The final drawing passes of the flux filled-U-shaped strip produced an oval shaped cross section in the flux cored, butt-joint tubing. The material had an alloy content per unit length approximately equivalent to that of solid alloy wire 1/16 inch in diameter.

Brazing tests of this flux cored material were conducted as follows. The specimens used were 5/8 inch brass tubing on 1/8 inch copper plate, with the tube end of the surface of the plate. Good joints were produced at the interface of the tube and plate by hand brazing with a torch. Approximately 3/4 inch of the flux cored wire was used in making this joint. Using similar specimens, good brazes were produced by cutting 3/4 inch of the cored material into small pieces and positioning the pieces inside the tube and adjacent to the tube plate interface. Heat was applied to the bottom of the copper plate or was applied on the outside of the brass tube.

EXAMPLE 8

Using the flux/binder mixture and the procedures described in Example 7, flux cored tubing was produced from alloy strip corresponding to composition D in Table No. 2. The alloy strip had a dead soft temper and was 0.004 inch thick by 0.203 inch wide. Final drawing passes produced a cored tubing having a round cross section. A unit length of the flux cored tubing had about the same amount of alloy as a solid alloy wire, 1/32 inch in diameter and the same unit length. The flux cored material of this example had good brazing properties.

EXAMPLE 9

Using the flux/binder mixture and the described procedures of Example 7, except that alloy strip of composition C in Table No. 2 was used; flux cored tubing was prepared from alloy strip 0.010 inch thick and 0.297 inch wide. The cored tubing had an oval cross section and when tested, this material performed satisfactorily as to brazed joint properties. In the same manner using the same binder and alloy, but using flux composition number 4 of Table 1; flux cored tubing was produced. This cored material had a unit length alloy equivalent of solid alloy wire 1/16 inch in diameter and gave good brazing results.

EXAMPLE 10

Flux cored tubing was prepared as described in Example 7. The same alloy strip and binder were used. The flux was changed and a flux corresponding to composition number 4 of Table No. 1 was used. The alloy content was equivalent to 1/16 inch diameter wire. This flux cored material had good brazing properties.

EXAMPLE 11

Alloy strip, composition A of Table 2, 7 mils thick and 0.195 inch wide, was drawn into flux cored tubing, using the general procedures outlined in Example 1. A mixture of 80 parts of flux, corresponding to composition No. 2 of Table No. 1, and 20 parts of binder was used to produce the flux core. The binder contained 40 percent copolymer and 60 percent toluene. The copolymer being 72 percent ethyl methacrylate and 28 percent methyl acrylate. Additional toluene was added to the flux/binder mixture to give the desired consistency.

Brass to brass, and steel to steel lap joints were brazed using this flux cored tubing, and good joints were obtained. Preform rings of this material were prepared and were evaluated. Steel pipe, one inch in diameter was placed on 1/8 inch steel plate. The flux cored preform ring was placed adjacent to the interface of the tube end and plate surface. The preform rings were placed inside the pipe or outside the pipe. Using furnace or torch brazing techniques, good joints were obtained in both cases.

EXAMPLE 12

The procedures of Example 7 were used, with some changes in the compositions, to produce flux cored tubing. Flux composition No. 2 of Table 1 was used. Same binder solution of 40 percent copolymer in 60 percent toluene was used. The flux/binder mixture was prepared from 400 parts flux, 120 parts of binder solution, and 65 parts of toluene to give the proper consistency. Alloy strip, composition B, Table No. 2, having a 0.007 inch thickness and 0.203 inch width was drawn into U shaped cross section. The flux/binder mixture was inserted into this U section and the final pass yielded tubing with a circular cross section.

EXAMPLE 13

Preform rings were prepared from flux cored, butt-joint tubing. The flux cored material was prepared as described in Example 7. The flux was composition No. 2 of Table 1, alloy was composition A of Table 2, while the binder solution was that described in Example 7. Flux binder mixture was made from 90 parts of flux and 10 parts of binder solution. Alloy strip used was 0.007 inch thick and 0.194 inch wide. The preform rings used weighed approximately 0.47 gram, with the flux/binder mixture being approximately 21.3 percent by weight of the total weight of the cored tubing. Specimens of type 304-stainless steel were prepared from: (1) a ring having a one inch O.D. and an I.D. of approximately 0.532 inch and 1/2 inch thickness; and (2) a cylindrical slug having a 0.526 inch O.D. and height of 0.500 inch. The slug was inserted approximately halfway in the ring. Bottom of the slug was about 0.26 inch from the bottom of the ring. The preform ring was placed around the slug and in contact with the top surface of the ring. Specimens of this type with the positioned preform were furnace, induction, torch brazed. All of these methods gave good joints.

EXAMPLE 14

A flux of composition No. 2 of Table 1 was prepared. The flux contained over 3 percent moisture and it was difficult to prepare a uniform flux/binder mixture using this flux. Lumps were produced in the flux/binder mixture which required extensive grinding to reduce to small particles. The flux was fused or melted in ceramic crucible until it was a clear, glassy substance. The fused material was allowed to cool and was ground to 100 mesh. The ground fused flux was mixed with 15 percent of binder solution. The binder solution was the same as used in Example 7. Two sizes of flux cored wire were made by drawing strips of alloy, composition B, Table 2.

A strip, 0.010 inch thick and 0.298 inch wide was drawn to an oval cross section shape. The oval was 0.121 inch wide and 0.080 inch high. This flux cored tubing contained flux binder of 25 percent by weight of the total weight of the cored tubing. Another strip, 0.007 inch thick and 0.203 inch wide was drawn; the flux cored tubing had an oval cross section, with the oval being 0.083 inch wide and 0.057 inch high. This flux cored tubing contained 21.75 percent by weight of flux binder mixture. Ring preforms were prepared from these two types of cored materials by wrapping the tubing around a cylindrical rod, with the seam of the tubing on the inside of the turns. This results in a ring with the seam facing the center of the ring. The wrapped tubing was cut along the longitudinal axis of the rod to produce the rings. The cutting process pinched the ends of the tubing and provided a seal on the ends, which prevents the flux from flowing out of the cored tubing ring ends during brazing. Preform rings were made from the above materials with a ring diameter of one inch, 1¼ inches and 1½ inches. Joints produced using these rings, had good properties.

EXAMPLE 15

Using the procedures of Examples No. 3, flux cored tubing was prepared. Tubing with flux composition No. 5, Table No. 1; and tubing with flux composition No. 6, Table No. 1 were prepared. Brass pipe to brass plate specimens were brazed with both cored wires. Good joints were obtained.

EXAMPLE 16

Using the procedures of Example 7, flux cored tubing was prepared. The flux used was composition 7, Table 1. The cored tubing had good brazing properties.

As widely different modifications of the invention may be made without departing from the scope and spirit of the invention, it is to be understood that the invention is not to be limited by the foregoing examples and descriptive details, except as defined by the following claims.

We claim:

1. A flux composition consisting essentially of 50% to 80% alkali metal fluoroborate, 9% to 30% alkali metal tetraborate, up to 15% boric acid, up to 10% alkali metal carbonate, and about 3% to 15% of an organic polymeric binder selected from the group consisting of homopolymers of acrylic acid ester, homopolymers of methacrylic acid esters, and copolymers of acrylic acid esters and methacrylic acid esters, said flux composition containing not more than about 3% free water.

2. A composition according to claim 1 where the organic polymeric binder is a copolymer of methyl acrylate and ethyl methacrylate.

3. A composition according to claim 1 where the organic polymeric binder is a copolymer containing 28% methyl acrylate and 72% ethyl methacrylate.

4. A composition comprising 57% $KBF_4$, 25% $K_2B_4O_7 \cdot 5H_2O$, 9% $B_2O_3$, 9% $K_2CO_3$ and a copolymer containing 28% methyl acrylate and 72% ethyl methacrylate.

5. A flux/alloy combination consisting essentially of a silver brazing alloy and a flux, said flux consisting essentially of 50% to 80% alkali metal fluoroborate, 9% to 30% alkali metal tetraborate, up to 15% boric acid, up to 10% alkali metal carbonate, and about 3% to 15% of an organic polymeric binder selected from the group consisting of homopolymers of acrylic acid esters, homopolymers of methacrylic acid esters, and copolymers of acrylic acid esters and methacrylic acid esters, said flux containing not more than about 3% free water.

6. A flux/alloy combination according to claim 5 where the organic polymeric binder is a copolymer of methyl acrylate and ethyl methacrylate.

7. A flux/alloy combination according to claim 5 where the organic polymeric binder is a copolymer containing 28% methyl acrylate and 72% ethyl methacrylate.

8. A flux/alloy combination comprising a silver brazing alloy, a flux containing 57% $KBF_4$, 25% $K_2B_4O_7 \cdot 5H_2O$, 9% $B_2O_3$, and 9% $K_2CO_3$, and a copolymer containing 28% methyl acrylate and 72% ethyl methacrylate.

9. A flux cored alloy combination consisting essentially of a silver brazing alloy cover and a flux core, said flux core consisting essentially of 50% to 80% alkali metal fluoroborate, 9% to 30% alkali metal tetraborate, up to 15% boric acid, up to 10% alkali metal carbonate, and about 3% to 15% of a binder selected from the group consisting of homopolymers of acrylic acid esters, homopolymers of methacrylic acid esters, and copolymers of acrylic acid esters and methacrylic acid esters, said flux containing not more than about 3% free water.

10. A flux cored alloy combination according to claim 9 where the alloy cover is thin wall tubing with a seam extending the length of the tubing.

11. A flux covered alloy combination consisting essentially of a silver brazing alloy core and a flux coating; said flux coating consisting essentially of 50% to 80% alkali metal fluoroborate, 9% to 30% alkali metal tetraborate, up to 15% boric acid, up to 10% alkali metal carbonate, and about 3% to 15% of a copolymer of methyl acrylate and ethyl methacrylate, said flux coating containing not more than about 3% free water.

12. A flux cored alloy combination consisting essentially of a thin wall silver brazing alloy tubing having a butt-joint seam that extends the length of the tubing and a flux core, said flux core consisting essentially of 50% to 80% alkali metal fluoroborate, 9% to 30% alkali metal tetraborate, up to 15% boric acid, up to 10% alkali metal carbonate, and about 3% to 15% of a binder selected from the group consisting of homopolymers of acrylic acid esters, homopolymers of methacrylic acid esters, and copolymers of acrylic acid esters and methacrylic acid esters, said flux containing not more than about 3% free water.

13. A flux cored alloy combination according to claim 12 where the binder is a copolymer of methyl acrylate and ethyl methacrylate.

14. A flux cored alloy combination consisting essentially of thin wall silver brazing alloy tubing having a butt-joint seam that extends the length of the tubing and a flux core, said flux core consisting essentially of 57% $KBF_4$, 25% $K_2B_4O_7 \cdot 5H_2O$, 9% $B_2O_3$, 9% $K_2CO_3$, and about 3% to 15% of a copolymer containing 28% methyl acrylate and 72% ethyl methacrylate, said flux core containing not more than about 3% free water.

References Cited in the file of this patent

UNITED STATES PATENTS

| | | |
|---|---|---|
| 2,452,995 | Cinamon | Nov. 2, 1948 |
| 2,520,206 | Goerg | Aug. 29, 1950 |
| 2,897,106 | Morrison | July 28, 1959 |